United States Patent Office 2,760,939
Patented Aug. 28, 1956

2,760,939

SILICA-MAGNESIA CATALYST HAVING IMPROVED REGENERATION CHARACTERISTICS

Marvin J. Den Herder, Chicago, Ill., assignor to Standard Oil Company, Chicago, Ill., a corporation of Indiana No Drawing. Application November 29, 1950,
Serial No. 198,225

3 Claims. (Cl. 252—457)

This invention relates to the conversion of hydrocarbon oils, and more particularly to the cracking of gas-oils and the reforming of gasoline and heavy naphtha for the manufacture of motor fuels of high antiknock rating. More specifically, the invention relates to a silica-magnesia catalyst of improved and stabilized regenerability, and to a process employing said improved catalyst for the conversion of hydrocarbon oils.

Catalysts of many sorts have been employed for the conversion of petroleum hydrocarbons, most of them being based upon silica-alumina as the active ingredient. Recently, however, silica-magnesia catalysts (as in Thomas U. S. Patent 2,432,634) have come into use, and have proved to be highly advantageous with respect to selectivity and catalytic activity. The utilization of the catalyst, however, has been seriously limited, owing to the fact that it suffers a rapid decline in regenerability during use. Most catalysts, when used for cracking or otherwise converting hydrocarbon oils, become deactivated through formation on their surfaces of a heavy coat of carbon, which must be burned off in order to restore the catalyst to its initial activity. This is readily done with, for example, silica alumina. Silica-magnesia, on the other hand, has the serious disadvantage that the longer it is used for converting hydrocarbons, the slower and more difficult is the burning of the deposited carbon therefrom. As a result, the regeneraiton must be effected at such high temperatures that the regenerator vessel must be constructed of expensive alloy steels; otherwise, the time required for regeneration is so long that uneconomically large regenerator vessels are required.

I have now produced a new type of silica-magnesia catalyst having a high and relatively stable regeneration rate. My new catalyst consists essentially of up to around 25 percent by weight of MgO, dry basis, in the form of catalytically active magnesium silicate, formed on the accessible surfaces of porous silica that has been specially preconditioned to enlarge the pores thereof to an average diameter greater than about 50 angstrom units. The required preconditioning is effected by treating silica in the form of a hydrogel or dried gel at an elevated temperature above about 600° F. in the presence of water vapor, or by digesting with aqueous alkali.

One object of my invention is to effect the conversion of hydrocarbon oils in a more efficient and economical manner. Another object is to prolong the useful life of silica-magnesia catalysts. A further object is to produce a silica-magnesia catalyst of improved regeneration characteristics. Other objects of my invention and its advantages over the prior art will be apparent from the specification and claims.

I have demonstrated that the major cause of the poor regeneration characteristics of the silica-magnesia catalysts heretofore available is the special type of stable pore structure found therein. I have found that such catalysts contain very few large pores; instead, they contain only pores of extremely small size, from about 18 to 30 angstrom units in diameter, which do not increase in size with use. These pores in fact tend to become plugged with carbon and masked with surface deposits of mineral matter from the charging stock. Such contaminants prevent access of oxygen, with the result that the burning rate of the carbon therein decreases rapidly as the catalyst is used. Carbon-burning rates are conveniently expressed in terms of the burning-rate constant, K, in the equation $$\frac{dc}{dt} = Kc$$

where $t$ is time and $c$ is the carbon content of the catalyst. (In cases in which the carbon burning is not a first-order reaction, K is obtained by plotting $dc/dt$ against $c$.) The burning-rate constant is conveniently determined in a specially adapted "Leco" carbon determinator, described by G. E. Schmitkons in a paper entitled "Determination of Carbon on Cracking Catalyst by the Leco Method;" Proc. Mid-Year Meeting, American Petroleum Institute, 14th Mid-Year Meeting 29M III (April 4–7, 1949) p. 25–38. Commercial silica-magnesia catalysts containing 30 percent by weight MgO initially have satisfactory burning-rate constants ranging from 0.004 to 0.005. After being used for some time, however, the burning-rate constant drops to a low and unsatisfactory level between about 0.0012 and 0.0017. I have succeeded in avoiding the shortcomings of the prior-art catalysts by preparing a homogeneous distribution of catalytically active magnesium silicate, containing small, active pores, throughout a silica lattice having comparatively large pores. My new catalysts have relatively stable burning-rate constants as much as five times as great as the prior-art silica-magnesia catalysts.

In preparing a preconditioned silica base for my catalysts, I may start with any porous silica structure. For example, I may form a silica hydrogel by adding a strong acid, such as sulfuric acid, hydrochloric acid, or the like, to an aqueous sodium silicate solution, such as water glass. The hydrogel is broken into small pieces, washed free of ionic impurities such as Na, SO₄, and the like, and optionally predried in air. The greater part of the volume of the resulting gel is ordinarily composed of small pores ranging from 10 to 35 angstrom units in diameter. The silica is thereafter preconditioned to enlarge and stabilize the pores thereof by heat treatment in the presence of water vapor at a temperature between about 600 and 1600° F. for about 2 to 24 hours, whereby the silica is dehydrated and its average pore size is increased to between about 50 and 200 angstrom units. I prefer to carry out the pretreatment in steam at a temperature between about 900 and 1200° F., but I may also employ an atmosphere of air or an inert gas such as nitrogen or carbon dioxide, or a mixture thereof, containing water vapor in at least the proportion ordinarily found in air. When the pretreating atmosphere is low in water vapor, higher temperatures (1200 to 1600° F.) should be employed.

A suitable alternative pretreatment method comprises digesting the silica for two to twenty-four hours at ordinary or elevated temperatures, preferably 200 to 300° F., with aqueous ammonium hydroxide containing from about 5 to 28 percent by weight of NH₃ concentrated ammonium hydroxide being preferred. Instead of ammonium hydroxide, aqueous solutions of other alkaline materials, such as soda ash, caustic soda, caustic potash, or water-soluble amines, may be used successfully in this method.

A mixture is thereafter prepared containing the preconditioned silica and up to 25 percent, preferably 5 to 25 percent, and optimally (for highest catalytic activity without adverse effect on regenerability) 15 to 25 percent by weight, dry basis, of magnesia as MgO in the form of a finely divided solid, such as calcined magnesite, or as a water slurry of magnesium hydroxide, or as a magnesium salt which can be decomposed to yield magnesia. Magnesium salts may be added to the silica as dry powders, as slurries, or as solutions; and magnesia may be produced therefrom in a conventional manner, depending upon the specific salt utilized. For example, magnesium formate, acetate, or nitrate can be thermally decomposed, while magnesium sulfate and magnesium chloride can be treated with ammonium hydroxide or an aqueous solution of other basic material to precipitate magnesium hydroxide, from which the contaminating ions are washed and the oxide is produced by heat treatment.

The mixed silica and magnesia are thereafter subjected to conditions which cause the oxides to react to form catalytically active magnesium silicate. For this purpose, digestion with water at an elevated temperature is suitable, preferably at a temperature between about 150 and 300° F. for a period of about 5 to 50 hours. Excess magnesia may be removed, if desired, by washing with an aqueous solution of a weak acid, suitably a solution containing from 5 to 25 percent by weight of acetic acid, formic acid, or the like. The catalyst is then dried and pulverized, pelleted, extruded, or otherwise formed into the shape required for the particular use in which it is to be employed. Finally, it can be calcined if desired at a temperature around 1000° F. according to conventional procedures to complete the drying thereof and to improve its mechanical strength.

My invention will be more fully understood from the following specific examples. The expressions "activity," "gas factor," and "carbon factor" used herein have the meaning defined by Shankland and Schmitkons in their article, "Determination of Activity and Selectivity of Cracking Catalysts," which appeared in volume 27 (III) of the Proceedings of the Americal Petroleum Institute, Twenty-seventh Annual Meeting, pages 57–77 (1947). The "burning-rate constant," as defined hereinabove, was determined by burning a one-gram sample of the carbonized catalyst at 1050° F. with air as the oxygen source.

*Example I*

A water glass solution containing 6 percent $SiO_2$ was adjusted to pH 5.3 by adding aqueous 10 percent sulfuric acid. The resulting hydrogel was washed free of sodium sulfate, digested in water for two hours at 212° F., and conditioned in steam for four hours at 1150° F. The treated gel, having an average pore diameter of 150 angstrom units, was slurried in water, and three catalysts were prepared from the resulting slurry by commingling finely divided magnesium oxide with portions thereof in quantities sufficient to produce catalysts containing 15, 20, and 24 percent by weight MgO, dry basis. The slurries were digested for 72 hours at 170–212° F., dried without being filtered, and calcined in air for four hours at 1000° F. The finished catalysts were tested by the method of Shankland and Schmitkons, referred to above, to measure their activity and selectivity in cracking a gas oil, and the resulting carbon-coated catalysts were thereafter tested to determine their carbon-burning rate constants, as a measure of their regenerability.

An additional quantity of the finished catalyst containing 24 percent MgO was subjected to an accelerated aging procedure by treatment with steam for sixteen hours at 1200° F. It was subsequently tested for activity and selectivity in cracking a gas oil, and its carbon-burning rate constant was measured as before. (The accelerated aging procedure, I have heretofore observed, lowers the carbon-burning rate constant of prior-art commercial silica-magnesia catalysts to around 0.0027 from an initial value of 0.004 to 0.005. Thus, the burning-rate constant of the carbonized fresh catalyst and of the carbonized, artificially aged catalyst together constitute a measure of the stability of the regeneration characteristics of the catalyst.) The results of the tests were as follows:

| MgO, Wt., Percent | Avg. Pore Diameter, A. | Indiana Activity | Gas Factor | Coke Factor | Burning-Rate Constant, K |
|---|---|---|---|---|---|
| 15 | 70.5 | 10.2 | 0.8 | 2.7 | 0.020 |
| 20 | 69.3 | 13.4 | 0.8 | 2.2 | 0.020 |
| 24 | 46.2 | 36.2 | 0.8 | 0.9 | 0.011 |
| 24 (aged) | 58.2 | 17.8 | 1.5 | 1.9 | 0.0062 |

*Example II*

A water glass solution containing 6 percent $SiO_2$ was adjusted to pH 5.3 with aqueous 10 percent sulfuric acid. The resulting hydrogel was washed free of sodium sulfate, digested in water for two hours at 212° F., and conditioned in air for four hours at 1000° F. From the dry gel, having an average pore diameter of 93 angstrom units, were prepared silica-magnesia catalysts containing 16 and 24 percent by weight of MgO according to the procedure described in Example I, and the catalysts were similarly tested, with the following results:

| MgO, Wt., Percent | Avg. Pore Diameter, A. | Indiana Activity | Gas Factor | Coke Factor | Burning-Rate Constant, K |
|---|---|---|---|---|---|
| 16 | 57.5 | 17.4 | 1.2 | 2.4 | 0.0088 |
| 24 | 38.7 | 30.8 | 1.2 | 1.8 | 0.0097 |
| 24 (aged) | 48.5 | 25.9 | 1.7 | 2.0 | 0.0058 |

*Example III*

A water glass solution containing 6 percent $SiO_2$ was adjusted to pH 7.5 with aqueous 10 percent sulfuric acid. The resulting hydrogel was washed free of sodium sulfate, and was conditioned in air for four hours at 1000° F. The resulting dry gel, having an average pore diameter of 75 angstrom units, was used in preparing silica-magnesia catalysts containing 16 and 24 percent by weight MgO, dry basis, according to the procedure described in Example I. Tests on the catalysts gave the following results:

| MgO, Wt., Percent | Avg. Pore Diameter, A. | Indiana Activity | Gas Factor | Coke Factor | Burning-Rate Constant, K |
|---|---|---|---|---|---|
| 16 | 52.8 | 19.9 | 0.7 | 1.8 | 0.0077 |
| 24 | 40.1 | 37.7 | 0.6 | 1.3 | 0.0088 |
| 24 (aged) | 51.4 | 34.4 | 1.3 | 1.2 | 0.0054 |

*Example IV*

A dry silica gel, prepared as described in Example I, and having an average pore diameter of 150 angstrom units, was slurried with a sufficient quantity of aqueous magnesium acetate solution to produce a finished catalyst containing 20 weight-percent MgO. The slurry was dried, and the magnesium acetate was decomposed to MgO by heating in air at 1000° F. for four hours. The resulting silica-magnesia mixture was then activated by digestion in water at 170–212° F. for 72 hours, and the catalyst was finished by heat treatment in air at 1000° F. for four hours. Tests on the completed catalyst gave the following results:

| MgO, Wt., Percent | Indiana Activity | Gas Factor | Coke Factor | Burning-Rate Constant, K |
|---|---|---|---|---|
| 20 | 29.9 | 0.78 | 0.73 | 0.0083 |
| 20 (aged) | 24.4 | 0.80 | 0.63 | 0.0039 |

My improved catalysts are broadly useful for the conversion of hydrocarbon oils in any of the various types of catalytic treating units, employing the fixed-bed, moving-bed, fluidized, or suspensoid techniques. My catalysts are suitable, for example, for cracking petroleum oils, such as gas oils, heavy naphthas, and the like, at temperatures in the range of around 800 to 950° F. and pressures which ordinarily range up to around 5 atmospheres absolute. My catalysts may also be advantageously employed for reforming gasolines to improve their antiknock rating, this operation being ordinarily carried out between about 900 and 1025° F., 5 to 25 atmospheres absolute, and liquid space velocities between about 0.1 and 2 per hour, in the presence of hydrogen. Other advantageous applications of my new catalysts will be apparent from the prior art.

While I have described my invention in connection with certain specific embodiments thereof, it is to be understood that I am not limited thereto. It will further be understood that any modifications or equivalents that would ordinarily occur to one skilled in the art are to be considered as lying within the scope of my invention.

In accordance with the foregoing description, I claim as my invention:

1. A process for preparing a silica-magnesia catalyst of improved regeneration stability for converting hydrocarbon oils which comprises heating a porous silica gel in contact with water vapor at a temperature between about 600 and 1600° F., whereby the pores of said silica gel are stabilized at an average diameter greater than about 50 angstrom units, preparing a mixture thereof with magnesia containing up to about 25 percent by weight MgO, dry basis, effecting a reaction between said silica and said magnesia whereby there is obtained a homogeneous distribution of catalytically active magnesium silicate throughout the pores of said stabilized silica gel, and drying the resulting composition.

2. A process for preparing a silica-magnesia catalyst of improved regeneration stability for converting hydrocarbon oils which comprises heating a porous silica gel in contact with water vapor at a temperature between about 600 and 1600° F. for a period of about 2 to 24 hours, whereby the pores of said silica gel are stabilized at an average diameter between about 50 and 200 angstrom units, preparing a mixture thereof with magnesia containing between about 5 and 25 percent by weight MgO, dry basis. effecting a reaction between said silica and said magnesia whereby there is obtained a homogeneous distribution of catalytically active magnesium silicate throughout the pores of said stabilized silica gel, and drying the resulting composition.

3. A process for preparing a silica-magnesia catalyst of improved regeneration stability for converting hydrocarbon oils which comprises contacting porous silica gel with steam at a temperature between about 900 and 1200° F. for a period of about 2 to 24 hours, whereby the pores of said silica gel are stabilized at an average diameter between about 50 and 200 angstrom units, preparing a mixture thereof with magnesia containing between about 15 and 25 percent by weight MgO, dry basis, digesting said mixture in water, whereby catalytically active magnesium silicate is formed on the surface of said pores, and drying the resulting composition.

References Cited in the file of this patent

UNITED STATES PATENTS

| | | |
|---|---|---|
| 2,470,411 | Corner | May 17, 1949 |
| 2,477,695 | Kimberlin | Aug. 2, 1949 |
| 2,481,825 | Connolly | Sept. 13, 1949 |
| 2,484,258 | Webb et al. | Oct. 11, 1949 |
| 2,544,869 | Webb et al. | Mar. 13, 1951 |
| 2,605,237 | Webb | July 29, 1952 |